J. J. CAMPODONICO.
TRACTOR TRANSMISSION.
APPLICATION FILED NOV. 27, 1918.

1,370,408.

Patented Mar. 1, 1921.

INVENTOR
John J. Campodonico
BY
Strong & Townsend
ATTORNEYS

UNITED STATES PATENT OFFICE.

JOHN J. CAMPODONICO, OF SAN FRANCISCO, CALIFORNIA.

TRACTOR TRANSMISSION.

1,370,408.  Specification of Letters Patent.  Patented Mar. 1, 1921.

Application filed November 27, 1918. Serial No. 264,393.

*To all whom it may concern:*

Be it known that I, JOHN J. CAMPODONICO, a citizen of the United States, residing at San Francisco, in the county of San Francisco and State of California, have invented new and useful Improvements in Tractor Transmissions, of which the following is a specification.

This invention relates to a power transmission and particularly to a heavy duty transmission for tractors, both of the creeper and the wheel type.

In operating tractors of various types it has been found that one of the prime factors in the proper operation of the tractor is to provide means for separately controlling or varying the speed of the creepers or wheels to effect easy steering. One of the common methods of controlling the direction of a creeper or wheel type tractor is to omit the differential and provide instead a clutch between each track or wheel and the rear drive shaft. Releasing one clutch transfers all the driving effort to one track or wheel which then naturally runs ahead of the other, thereby facilitating the steering of the tractor.

Clutches interposed between the creepers and the rear driving shaft, as described, must necessarily be large and powerful to take care of the enormous torque or load imposed. The clutches, due to this fact, wear rapidly as they are constantly thrown into and out of action when the tractor is operating and therefore require constant care and adjustment. Other disadvantages, such as increased weight, cost of manufacture and maintenance, constant breakage, etc., and other objectionable features, all detract from the object sought and therefore leaves a problem far from satisfactory either from an operating or structural point of view.

One of the objects of the present invention is to provide a heavy duty transmission for tractors in which the clutches are interposed between the engine propeller shaft and the transmission and not between the transmission and the tracks or wheels, as has heretofore been practised, thereby permitting a substantial reduction in the size of the clutches and furthermore practically eliminating the troubles and objectionable features encountered where large clutches have been employed between the creepers and the transmission.

Another object of the invention is to provide a duplex transmission through which power may be transmitted from the clutches direct to either creeper or wheel or to both in unison. Further objects will hereinafter appear.

The invention consists of the parts and the construction, combination and arrangement of parts as hereinafter more fully described and claimed, having reference to the accompanying drawings in which—

Figure 1:
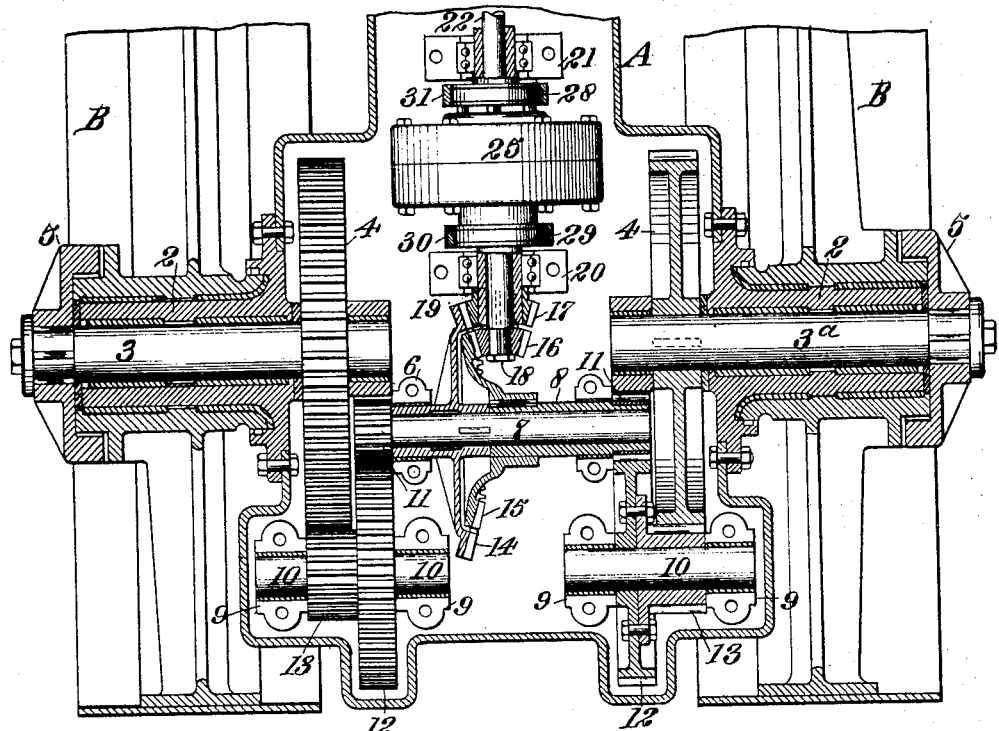
Figure 1 is a plan view partially in section, showing the rear end of a tractor.
Figure 2:
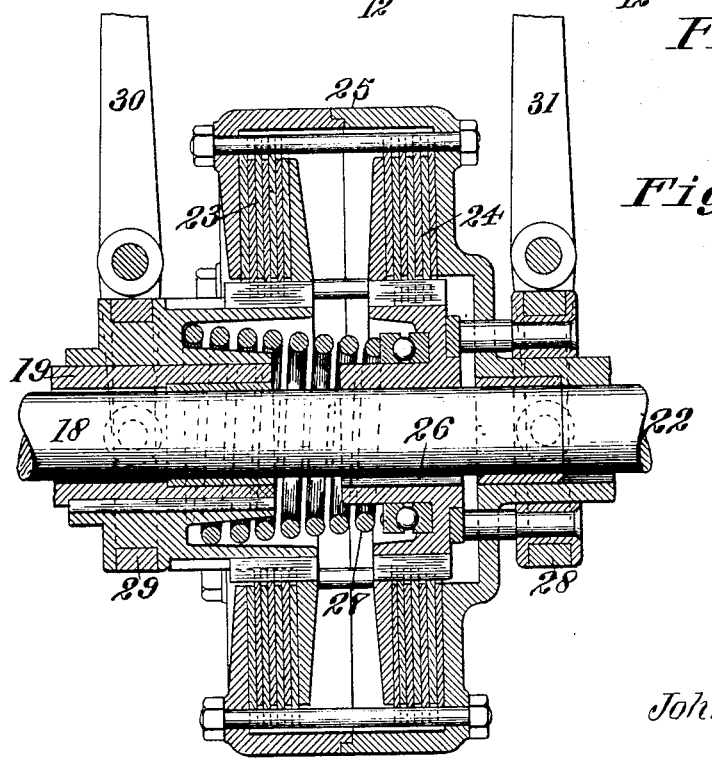
Fig. 2 is an enlarged detail view of the steering clutches.

Referring to the drawings in detail, A indicates an integral transmission case which may be secured to the main frame of the tractor or formed integral therewith. Journaled on hub extensions 2, formed one on each side of the casing A, is a pair of driving members, in this instance represented by wheels B. These wheels are driven from a pair of driving shafts shown at 3 and $3^a$, journaled within the respective bearing hubs 2. Secured on the inner end of each shaft is a gear 4 and secured on the outer end of each shaft is a jam coupling 5 which forms a driving connection between the wheels B and the respective shafts. Journaled centrally of the casing in bearings 6 is a countershaft 7 and a countersleeve shaft 8, the sleeve shaft 8 being journaled in the bearings 6 and on the shaft 7 while the shaft 7 is journaled in the bearings 6 and in the sleeve shaft 8. Journaled in bearings 9 formed within the casing, are a pair of intermediate shafts 10. Secured on the outer ends of the shafts 7 and 8 is a pair of driving pinions 11 and intermeshing with each pinion is a gear 12 which is keyed to the respective intermediate shafts, as shown. Also keyed or otherwise secured on each intermediate shaft is a pinion 13 which remains in constant mesh with the gears 4. Secured on the shaft 7 is a bevel gear 14 and secured on the sleeve shaft 8 is a bevel gear 15. Intermeshing with the respective gears are a pair of bevel pinions 16 and 17. The pinion 16 is secured on a shaft 18 and the pinion 17 on the sleeve shaft 19. These shafts are supported in bearings 20 and 21, as shown, and power may be transmitted from the engine propeller shaft 22 to either or both shafts by means of a pair of clutches generally indicated at 23 and 24. This is accomplished in the following manner: Keyed or otherwise secured on the end of the engine propeller shaft is a fly-wheel or clutch-housing 25. Mounted within said housing is a pair of multiple disk clutches 23 and 24, the clutch 24 being splined as shown at 26, to the shaft 18 while the clutch 23 is splined and slidably mounted on the sleeve shaft 19. The clutches 23 and 24 are normally held in engagement by a spring 27 but either clutch may be thrown out of operation by clutch collars 28 and 29 and by separately operated levers 30 and 31 whenever desired.

From the foregoing description it can be seen that a duplex gear transmission has been formed between the engine propeller shaft and the respective driving shafts 3 and 3ª, power being transmitted from the propeller shaft 22 to the shaft 3 through the clutch 23, the bevel gears 17 and 14, shaft 7 and the gear train 11, 12, 13 and 4 while power is transmitted to the opposite shaft 3ª, through a clutch 24, shaft 18, bevel gears 15 and 16, sleeve shaft 8 and the gear train 11, 12, 13 and 4. Power may therefore be transmitted direct from the propeller shaft to either driving shaft or to both in unison as either clutch 23 or 24 may be thrown out of engagement independently of the other or both may remain in engagement when a straight drive is desired. It is therefore possible to instantly release either driving wheel or creeper track whenever desired, thereby facilitating the steering operation of the tractor.

To clearly illustrate the advantages of the present arrangement, it may be assumed that the speed of the driving shafts 3 and 3ª, due to the gear ratios provided, is approximately one to thirty of the engine propeller shaft. A clutch interposed between the transmission and the driving wheel would therefore necessarily carry a load or torque strain thirty times greater than a clutch placed between the engine propeller shaft and the transmission, or vice versa, a clutch placed between the engine propeller shaft and the transmission would only have to carry one-thirtieth of the load of a clutch interposed between the driving wheel and the transmission. It can therefore readily be seen that the arrangement here shown permits the use of small compact clutches that may be placed directly within the gear case and that will not be affected by the lubricant as clutches of the multiple disk type may be employed. Further, clutches of this character should not require constant attention or adjustment because the load imposed upon them is small compared with the larger clutches otherwise required. Again, a clutch carried by a high speed shaft can be much more readily manipulated than a large clutch on a slow speed shaft; that is, a small clutch on a high speed shaft will gradually take up the load and not subject the connected mechanism to shocks or strains while a large clutch has a tendency to suddenly engage and thereby impose the loads so quickly that the gears are often stripped or other parts of the mechanism injured. Another advantage obtained by the present arrangement is a compact structure comprising clutches and reduction gears, all of which may be inclosed within a single case, thereby permitting perfect lubrication and simultaneously excluding all grit and dust. The cost of manufacture should also be materially reduced; similarly, maintenance and repair cost.

While a specific form of multiple disk clutch is here shown, I wish it understood that a cone clutch or any other connecting mechanism may be employed; similarly, that the materials and finish of the several parts from the transmission may be such as the experience and judgment of the manufacturer may dictate.

Having thus described my invention, what I claim and desire to secure by Letters Patent is:—

1. In a transmission of the character described an engine shaft, a sleeve revoluble on said shaft, gears fixed upon the shaft and the sleeve, and independent controlling clutches whereby motion may be transmitted through either or both sets of gears.

2. In a transmission of the character described an engine shaft, an independent shaft forming an extension of the engine shaft, a sleeve turnable on the independent shaft, and a pair of clutch members driven by the engine shaft whereby motion may be transmitted either to the independent shaft or the sleeve or to both in unison.

3. In a transmission of the character described an engine shaft, an independent shaft forming an extension of the engine shaft, a sleeve turnable on the independent shaft, a pair of clutch members driven by the engine shaft whereby motion may be transmitted either to the independent shaft or the sleeve or to both in unison, two sets of gears independent of each other, means for transmitting power from the sleeve to one set of gears, and means for transmitting power from the independent shaft to the other set of gears.

4. In a transmission of the character described an engine shaft, an independent shaft forming an extension of the engine shaft, a sleeve turnable on the independent shaft, a double clutch supported on and driven by the engine shaft, a clutch member carried by the independent shaft, means for moving said clutch into and out of engagement with the double clutch, a clutch member carried by the sleeve, and means for throwing said clutch into or out of engagement with the double clutch.

5. In a tractor, the combination with the engine propeller shaft and a divided rear driving shaft of a countershaft, a sleeve shaft turnably mounted upon and independent of the countershaft, a pair of clutches adapted to be driven by the engine propeller shaft, means for transmitting power from one of said clutches to drive the countershaft, means for transmitting power from the other clutch to drive the sleeve shaft, means for transmitting power from the sleeve shaft to one-half of the rear driving shaft and means for transmitting power from the countershaft to drive the other half of the driving shaft.

6. In a tractor, the combination with the engine propeller shaft and a divided rear driving shaft of a countershaft, a sleeve shaft turnably mounted upon and independent of the countershaft, a pair of clutches adapted to be driven by the engine propeller shaft, means for transmitting power from one of said clutches to drive the countershaft, means for transmitting power from the other clutch to drive the sleeve shaft, means for transmitting power from the sleeve shaft to one-half of the rear driving shaft, means for transmitting power from the countershaft to drive the other half of the driving shaft and means permitting independent or unitary operation of the clutches to drive one-half or the other of the driving shaft independently or in unison with each other.

7. In a tractor, the combination with the engine propeller shaft and a divided rear driving shaft of a countershaft, a sleeve shaft turnably mounted upon and independent of the countershaft, a pair of clutches adapted to be driven by the engine propeller shaft, a gear driven by each clutch, a gear on the countershaft intermeshing with one of said clutch driven gears, a gear on the sleeve shaft intermeshing with the other of said clutch driven gears, a gear train interposed between the sleeve shaft and one side of the divided driving shaft and a gear train interposed between the countershaft and the other side of the divided driving shaft.

8. In a tractor, the combination with the engine propeller shaft and a divided rear driving shaft of a countershaft, a sleeve shaft turnably mounted upon and independent of the countershaft, a pair of clutches adapted to be driven by the engine propeller shaft, a gear driven by each clutch, a gear on the countershaft intermeshing with one of said clutch driven gears, a gear on the sleeve shaft intermeshing with the other of said clutch driven gears, a gear train interposed between the sleeve shaft and one side of the divided driving shaft, a gear train interposed between the countershaft and the other side of the divided driving shaft and means permitting independent or unitary operation of the clutches.

9. In a transmission of the character described an engine shaft, a sleeve turnable on the shaft, a gear secured to the shaft, a gear secured on the sleeve, independent sets of traction driving means with which said gears engage, and independent clutches upon the engine shaft by which the gears are controlled.

10. In a tractor of the character described including ground engaging means, sets of gears by which the tractor means are driven independently, a prime motor including a motor shaft, a sleeve turnable upon the shaft, bevel gear wheels upon both the shaft and the sleeve, one bevel gear intermeshing with one set of gears and one with the other set of gears, and clutches upon the motor shaft by which either or both set of gears may be driven.

11. In a tractor of the character described including propelling wheels, independent sets of gears connected with each of said wheels, a shaft journaled between said gears and carrying a pinion engageable with one set of gears, a sleeve turnable on said shaft having a pinion engaging the other set of gears, a motor shaft having a sleeve thereon, pinions on the shaft and sleeve, intermeshing gears upon the first named shaft and sleeve, and clutches on the motor shaft and its sleeve adapted to transmit power to either set of gears.

In testimony whereof I have hereunto set my hand in the presence of two subscribing witnesses.

JOHN J. CAMPODONICO.

Witnesses:
 JOHN H. HERRING,
 W. W. HEALEY.